United States Patent Office 3,325,398
Patented June 13, 1967

3,325,398
VAPOROUS GAS OIL CRACKING
Richard E. Ashwill, Claymont, Del., assignor to Air Products and Chemicals, Inc., Philadelphia, Pa., a corporation of Delaware
No Drawing. Filed Oct. 22, 1965, Ser. No. 502,444
3 Claims. (Cl. 208—120)

This invention relates to catalytic cracking of gas oil to hydrocarbons of the gasoline boiling range.

In the early commercial operation of fixed bed catalytic cracking units, the feedstock was selected to have an end boiling point significantly below the cracking temperature. Only moderate conversions were attainable by such pure vapor phase operation, and the weight ratio of products boiling in the 0°–200° C. range (sometimes designated herein as $C_4$+gasoline) to by-products (coke, hydrogen, methane, ethane, propane, ethylene and propylene) was generally of the magnitude of 2 to 1 to 3 to 1. Higher conversions were more readily obtained by using gas oils comprising components boiling above about 400° C., but a relatively low ratio of $C_4$+ gasoline product to by-products was characteristic of most industrial cracking operations even at relatively high conversions.

The coke formed as a by-product deposits in and on the catalyst and adversely affects the activity of the catalyst. Removal of the coke is a periodic necessity and is usually effected by oxidative combustion. The exothermic heat generated by such oxidation is usually in excess of the heat required for the endothermic cracking reaction so that only a part of the heat is utilized for heating the catalyst to reaction temperature. The propane and other gases are employed as fuel and/or marketed at prices generally less attractive than the price for the gasoline product. For many years the market for the unconverted liquid hydrocarbons boiling above 200° C., sometimes called catalytic gas oil, was sufficiently large and attractive that low conversion was permissible in a catalytic cracking unit. Under changing market conditions, usually of a seasonal nature, involving increasing demands for gasoline and decreasing demands and lower prices for catalytic gas oil, refiners have sought methods for achieving higher conversion of the refractory gas oil types herein contemplated to gasoline. The use of conventional cracking and cracking catalysts at higher severity has continued to provide low ratios of $C_4$+ gasoline to by-products. In order to achieve higher conversion in the catalytic cracking unit higher boiling gas oils are employed so that a significant portion of the gas oil boiling in the 200–300° C. range is often marketed through channels by-passing the catalytic cracking step or is subjected to hydrotreatment which is generally more expensive than the lower pressure catalytic cracking.

In the development of the present invention a catalyst has been perfected which has advantages as a broad spectrum cracking catalyst, but which is outstandingly superior in the cracking of low boiling gas oil.

In accordance with the present invention a gas oil boiling predominantly within the range of 200–400° C. is subjected to such a high severity of cracking as to achieve a yield of from 60%–90% by weight of $C_4$+ gasoline boiling in the range from 0–200° C., said high severity cracking conditions comprising the use of steam, a temperature within the range from 460° C. to about 510° C., a space rate from about 0.5 to about 4 volumes of gas oil per volume of catalyst per hour; said cracking being conducted at about atmospheric pressure in a zone filled with catalyst prepared by forming particles of an admixture of clay dehydrated to a water content in the range from 0.1–1% by weight, siliceous material, low iron clay diluent, and aqueous alkaline material, aging with the particles in oil at ambient temperature for about a day, thereafter aging the particles in oil at a temperature from about 80° C. to about 120° C. for about a day to prepare particles comprising 5 to 25% crystalline sodium faujasite, exchanging a major portion of the sodium with ammonium, volatilizing ammonia and water from the particles to prepare particles comprising 5 to 25% hydrogen faujasite, not more than a minor amount of the faujasite having zeolitically held metal cations, and stabilizing the particles by treatment with steam at a temperature in the range from about 600° C. to about 850° C.; and separating from the effluent from the catalyst zone a liquid product boiling in the range from 0–200° C. having a ratio of weight of liquid product to weight of by-product which is larger than 5 to 1. It is surprising that a gasoline to by-product weight ratio of at least 5 to 1 is achieved at such a high conversion starting with such a low boiling gas oil, inasmuch as such results are in several respects the reverse of trends to which cracking technologists have been accustomed.

The nature of the invention is further clarified by reference to the following examples.

*Example 1*

A cracking grade of kaolin, containing less than 0.4% iron oxide on an anhydrous basis, was calcined to prepare meta kaolin containing hydrate water in the range from 0.1–1% by weight. Such meta kaolin is commercially available, and has been described in connection with other procedures for the preparation of cracking catalysts. Mullite is a crystalline alumino silicate sometimes synthesized from other aluminosilicates by very high temperature treatment. The team "mullitized kaolin" designates a product containing less than about 0.1% by weight hydrate water, prepared by calcining meta kaolin and/or kaolin at conditions more severe than required for producing meta kaolin. A grade of kaolin containing about 14% hydrate water is a suitable diluent in the manufacture of the catalyst in the present invention. A composition was prepared consisting of:

|  | Kg. |
|---|---|
| Catalytic grade kaolin diluent | 73.09 |
| Meta kaolin | 5.22 |
| Mullitized kaolin | 31.33 |
| Clays | 109.64 |
| $Na_2O$ in NaOH solution | 5.88 |
| $H_2O$ in NaOH solution | 41.12 |
| Alkalized clay dough | 156.64 |

This composition was thoroughly admixed by mulling to a homogeneous plastic dough. The plastic dough was vacuum extruded and sliced to form pellets having sufficient strength and freedom from adhesiveness to maintain their shape and not stick together during further processing.

Compositions comprising sodium hydroxide and meta kaolin can be aged and recrystallized to form sodium faujasite precursors for cracking catalysts while simultaneously increasing the strength of the particles. Sodium faujasite in a concentration providing about 20% hydrogen faujasite in a sorptive clay carrier is preferred in cracking catalyst manufacture. Most of the sodium faujasite is exchanged to form ammonium faujasite, which is converted to a product conveniently called hydrogen faujasite (without regard to the degree to which acid anhydride linkages are formed) by heating in a hot gas stream. The hydrogen faujasite must have a silica to alumina unit mol ratio greater than about 3.3 in order to achieve sufficient resistance to inactivation by the presence of relatively large amounts of high temperature process steam to be characterized as a steam stable cracking catalyst. Precursors for such advantageous cracking catalysts are prepared by controlled aging of alkalized clay.

The particles were immersed in an inert hydrocarbon oil and aged at ambient temperature for about a day and then for about a day at about 96° C. The aged particles were treated 14 times with about 1 molar solution of aqueous ammonium nitrate (density about 1.0317 g./ml. or about 7.7% by weight) at about 95° C. for about 2 hours for each treatment. The quantity of ammonium nitrate used per treatment corresponds to about one-half the stoichiometric requirements for the quantity of sodium faujasite ($Na_2O \cdot Al_2O_3 \cdot 4.4SiO_2$) expected in the particles. The quantity of sodium faujasite in the precursor just prior to exchange with the ammonium salt was measured by X-ray diffraction and found to be about 22% on an anhydrous basis. Factory experience has favored the convenience of using ammonium nitrate solution even for the first aqueous treatment of the aged pellets even though the particles contain excess sodium hydroxide which can be removed by water washing. The total quantity of ammonium nitrate employed was 700% of the stoichiometric requirement (600% excess) for the conversion of the sodium faujasite to ammonium faujasite, but the ion exchange was not exhaustive. It is convenient to consider the approximately 22% faujasite content of the precursor at this stage as about 75% ammonium faujasite and about 25% sodium faujasite. The residual alkali in the exchanged particles comprising 22% faujasite (75% ammonium, and 25% sodium) was 0.8% $Na_2O$ on an anhydrous basis. Terminology such as ammonium faujasite is appropriate notwithstanding the presence of such residual alkali. Exhaustive ion exchange can further reduce the sodium content, but cracking catalysts containing about 0.8% sodium can be manufactured more conveniently than faujasite type cracking catalysts with less residual sodium.

The particles comprising ammonium faujasite were dried at 121° C. for 4 hours and then transferred to a container suitable for the subsequent heat treatment. The container with included dry particles was placed in a preheated furnace and the temperature of the contents was raised to 810° C. in the presence of flowing steam. The nominal heat treatment thereafter was at 810° C. for 4 hours in a flowing 100% steam atmosphere. The initial stage of such heat treatment can be deemed a further drying step followed by a deammoniation step followed by dehydration step and then the stabilization step. There is much overlapping of the conceivable reactions during the heat treatment, all reactions occurring simultaneously at rates which vary. The container was removed from the furnace and allowed to cool to room temperature. The catalyst was removed from the container.

*Example II*

The catalyst of Example I was employed in the cracking of light atmospheric gas oil in a test operation and at conditions comparable to a similar cracking operation employing the same charge stock cracked in the presence of a commercial kaolin cracking catalyst of the type employed daily in the processing of thousands of barrels of petroleum stocks.

The light atmospheric gas oil had a specific gravity of 0.878 g./ml. (29.6° API) with the following distillation distribution (ASTM D-86).

| | ° C. |
|---|---|
| Initial | 244 |
| 5% | 279 |
| 10% | 289 |
| 20% | 298 |
| 30% | 305 |
| 40% | 311 |
| 50% | 318 |
| 60% | 327 |
| 70% | 336 |
| 80% | 350 |
| 90% | 372 |
| 95% | --- |
| EP | --- |

The average molal boiling point was 307° C., the sulfur content was 0.34 wt. percent, the Ramsbottom carbon was 0.13 wt. percent, and the Aniline Point was 162.4° F. (72.4° C.).

In each test 200 ml. of catalyst was employed in identical equipment comprising electrically heated furnaces for the catalyst containers with associated means for supplying controlled amounts of charge stock and steam to the reaction zone and the means to recover and/or identify the quantities and types of reaction products. The following tabulation shows the conditions and the results.

TABLE I

| Catalyst | Catalyst of Example I | Commercial Kaolin |
|---|---|---|
| Cracking Conditions: | | |
| On-stream time, minutes | 7.5 | 30 |
| Space Rate (Vol. of liquid/Vol. of catalyst/hour) | 2.0 | 0.5 |
| Temperature, ° C | 510 | 510 |
| Pressure | Atmos. | Atmos. |
| Steam, weight percent of charge | 10 | 10 |
| Catalyst to oil ratio | 4 | 4 |
| Relative Severity | 1 | 4 |
| Results (Yields): | | |
| Gas Gravity (Air=1) | 1.62 | 1.44 |
| Vol. Percent Gasoline | 65.0 | 35.2 |
| Wt. Percent Gasoline | 56.3 | 30.5 |
| Wt. Percent Gas | 13.2 | 23.4 |
| Wt. Percent Coke | 1.6 | 3.8 |
| Wt. Percent Conversion | 71.1 | 57.7 |
| Wt. Percent Gasoline Selectivity | 79.3 | 52.9 |

These data illustrate an outstanding superiority of the catalyst of Example I as is evident from noting that at only one quarter of the severity of operation (a value obtained by dividing the catalyst to oil ratio by the space rate) the new catalyst produces from the refractory charge considerably less by-product gas and coke with an appreciably higher conversion level. Thus, the result of such an outstanding increase in gasoline yield is a surprising improvement.

*Example III*

A catalyst was prepared in a manner similar to that of Example I, using similar but larger proportions of the precursor materials, processed in similar manner with a minor variation in the final heat treatment in that this heat treatment was conducted at conditions including a time of 4 hours in an atmosphere of 100% steam and at a temperature of about 820° C. This catalyst was tested on a larger scale at simulated plant conditions. The charge stock was the light atmospheric gas oil described in Example II.

For comparative purposes the results obtained with a commercial kaolin cracking catalyst tested at comparable conditions with a different charge stock but of the same type are presented. The charge stock of this run is identified below and is seen to come within the bounds of the stocks herein contemplated. The gas oil had a specific gravity of 35.4° API with the following distillation distribution (ASTM D-86)

| | ° C. |
|---|---|
| Initial | 225 |
| 5% | 242 |
| 10% | 248 |
| 20% | 258 |
| 30% | 262 |
| 40% | 270 |
| 50% | 277 |
| 60% | 287 |
| 70% | 299 |
| 80% | 317 |
| 90% | 347 |
| 95% | 376 |
| E.P. | 400 |

The sulfur content was 0.15 wt. percent and the Aniline Point was 163.8° F.

The following conditions were employed to obtain the tabulated results.

| Catalyst | Catalyst of Example III | Commercial Kaolin |
|---|---|---|
| Cracking Conditions: | | |
| Space Rate (Vol. of liquid/Vol. of catalyst/hour) | 1.00 | 1.5 |
| Catalyst/oil ratio (Vol./Vol.) | 2.53 | 3.3 |
| Average Bed Temperature, °C | [1] 483 | 482 |
| Pressure, g./cm.$^2$ g | [2] 704 | 704 |
| Steam, Wt. percent charge | 4 | 10 |
| Time on Stream (minutes) | 24 | 12.25 |
| Relative Severity | 2.53 | 2.20 |

| | Catalyst of Example III | | Commercial Kaolin | |
|---|---|---|---|---|
| | Volume, Percent | Wt. Percent | Volume, Percent | Wt. Percent |
| Yields: | | | | |
| Conversion | 76.2 | 74.2 | 49.8 | 49.5 |
| $C_5+$ Gasoline | 60.9 | 53.1 | 31.2 | 28.3 |
| Catalytic Gas Oil | 23.8 | 25.8 | 50.2 | 50.5 |
| $C_4$ Cut | 16.4 | 10.8 | 14.0 | 9.6 |
| Dry Gas ($C_3$ and lighter) | | 8.6 | | 8.2 |
| Coke | | 1.8 | | 3.4 |

[1] 902° F.
[2] 10 p.s.i.g.

The results show that in accordance with the present operation there is obtained 63.9 weight percent $C_4+$ gasoline as compared to only 37.9 weight percent $C_4+$ gasoline obtained with the kaolin catalyst. The attainment of 6.14 ratio of $C_4+$ gasoline to by-products at a 74.2 weight percent conversion in the present operation is remarkable as compared with 3.2 ratio of $C_4+$ gasoline to by-products at a 49.5 weight percent conversion obtained in the comparative run. This is an unusual and highly desirable result on the basis of known trends relied on by cracking technologists, and evidences a remarkable combination of activity and selectivity of the present cracking catalyst.

Obviously many modifications and variations of the invention as hereinbefore set forth may be made without departing from the spirit and scope thereof, and therefore only such limitations should be imposed as are indicated in the appended claims.

What is claimed is:

1. In the processing of petroleum in which selected fractions are cracked to lower boiling fractions, the improvement which consists of separating a hydrocarbon fraction boiling predominantly within the range from 200° C. to 400° C., and directing the vapors of said fraction together with steam through a catalytic cracking zone at about atmospheric pressure at a temperature within the range from about 460° C. to about 510° C. at a space rate of about 0.5 to 4 volumes of oil per volume of catalyst per hour, said zone being filled with catalyst prepared by forming particles of an admixture of clay dehydrated to a water content in the range from 0.1 to 1% by weight, siliceous material, low-iron clay diluent, and aqueous alkaline material, aging the particles in oil at ambient temperature for about a day, thereafter aging the particles in oil at a temperature in the 80 to 120° C. range for about a day to prepare particles comprising 5 to 25% crystalline sodium faujasite, exchanging a major portion of the sodium with ammonium, volatilizing ammonia and water from the particles to prepare particles comprising 5 to 25% hydrogen faujasite, not more than a minor amount of the zeolite having zeolitically held metal cations, and stabilizing the particles by treatment with steam at a temperature in the range from about 600° C. to about 850° C.; maintaining high severity of temperature and space rate to convert from 60% to 90% by weight of the feed to products boiling below 200° C.; and separating from the effluent from the catalyst a liquid product boiling in the range from 0° to 200° C. having a ratio of weight of liquid product to by-product which is larger than 5 to 1.

2. In the process according to claim 1 said catalyst being prepared by the steps including forming particles of an admixture of a minor portion of meta kaolin, a minor portion of mullite and a major portion of catalytic grade kaolin with aqueous sodium hydroxide, said admixture having been mulled to a plastic dough and extruded to form said particles.

3. The process of claim 2 in which the steam is about 4% by weight of a feedstock having a 5%–95% ASTM distillation range from about 242° C. to about 376° C. and the cracking zone is maintained at about 483° C. at a space rate of about one, whereby the weight of $C_4+$ gasoline is more than 6 times the coke plus propane and lighter gas at a conversion greater than 70%.

References Cited
UNITED STATES PATENTS

| 2,914,459 | 11/1959 | Mills et al. | 208—130 |
| 3,119,660 | 1/1964 | Howell et al. | 23—112 |
| 3,130,006 | 4/1964 | Rabo et al. | 23—110 |
| 3,130,007 | 4/1964 | Breck | 23—113 |

DELBERT E. GANTZ, *Primary Examiner.*

A. RIMENS, *Assistant Examiner.*